United States Patent [19]

Horiuchi

[11] Patent Number: 5,307,115
[45] Date of Patent: Apr. 26, 1994

[54] FILM END HOLDER FOR PHOTOGRAPHIC PRINTER

[75] Inventor: Satoru Horiuchi, Tokyo, Japan

[73] Assignee: Fuji Photo Film Co., Ltd., Kanagawa, Japan

[21] Appl. No.: 36,865

[22] Filed: Mar. 25, 1993

[30] Foreign Application Priority Data

Mar. 25, 1992 [JP] Japan ................... 4-067590

[51] Int. Cl.$^5$ ............................................. G03B 27/62
[52] U.S. Cl. ................................................ 355/75
[58] Field of Search ................................. 355/72, 75

[56] References Cited

U.S. PATENT DOCUMENTS

| 4,097,147 | 6/1978 | Portewig ............... 355/75 X |
| 4,931,831 | 6/1990 | Knecht et al. ............ 355/75 |
| 5,138,371 | 8/1992 | Benker et al. ............ 355/72 |

FOREIGN PATENT DOCUMENTS 0320454 6/1989 European Pat. Off. .
3823076 1/1990 Fed. Rep. of Germany .

Primary Examiner—Richard A. Wintercorn
Attorney, Agent, or Firm—Sughrue, Mion, Zinn, Macpeak & Seas

[57] ABSTRACT

A film end holder includes a rectangular and hollow main body and a guide plate projected upward from the main body. First and second film end holders are attached to both sides of the work table of a photographic printer. The trailing end portion of a developed photographic film is inserted in the main body of the first film end holder while the leading end portion is inserted in the passage of the film carrier of the work table. Accordingly, in the beginning of printing, the developed photographic film is looped between the first film end holder and the film carrier. The leading end portion being advanced from the film carrier during printing is guided by a guide plate to enter the main body of the second film end holder. Thereafter, a loop is formed between the film carrier and the second film end holder. Therefore, the photographic film will never be brought into contact with the floor and is thus protected from dust and scratches.

20 Claims, 5 Drawing Sheets

FILM END HOLDER FOR PHOTOGRAPHIC PRINTER

BACKGROUND OF THE INVENTION

1. Field of the Invention

The present invention relates to a film end holder for a photographic printer and more particularly to a film end holder which is attached to a photographic printer to prevent a developed photographic film from coming into contact with the floor.

2. Description of the Related Art

Minilabs which include a photographic film processor and a photographic printer are well known. In such a device, the photographic film is pulled out of a cassette developed by the film processor, and subsequently is subjected to a printing process by the printer.

The printer has a compact main body and a work table which is mounted to the front of the main body and provided with a film carrier. The main body has an exposure section and a developing section. An exposure opening is formed in the film carrier. In printing, the leading end of the developed photographic film is inserted into the film carrier, which then feeds the developed photographic film to position frames thereof one by one at the exposure opening to print the images of the frames onto a color paper in a sequential manner.

The entire length of the developed photographic film is often longer than the height of the work table and the width of the printer. Therefore, when printing several frames located in the leading or trailing ends portions of the developed photographic film, the other opposite end portion of the film hangs down from the work table onto the floor. As a result, the opposite portion is subjected to dust and scratches may be formed thereon.

In view of the above problem, there was introduced a clamp device as disclosed in U.S. Pat. No. 4,931,831 (corresponding to Japanese Laid-Open Publication No. 1-222251). The clamp device consists of a roller for pressing and end portion of a developed photographic film with its own weight and a bracket for supporting the roller so as to rotate and move up and down. The bracket is attached to a work table. The roller presses the end portion of the developed photographic film to loop the photographic film to make the length of the developed photographic film less than half the entire length of the developed photographic film. However, such a device is complex and expensive.

Further, U.S. Pat. No. 5,138,371 discloses an L-shaped clamp arm attached rotatably to a work table. A portion of the clamp arm presses an end portion of a developed photographic film to form a loop. The end portion of the developed photographic film slips off the clamp arm when the loop is gone. This clamp device requires an exclusive work table, similar to the device disclosed in U.S. Pat. No. 4,931,831. Therefore, it cannot be used with printers now in operation.

SUMMARY OF THE INVENTION

In view of the foregoing, it is an object of the present invention to provide a film end holder which has a simple structure and can be manufactured at a low cost.

It is another object of the present invention to provide a film and holder which can be used with photographic printers now in operation.

In order to achieve the above and other objects of the present invention, a film end holder is attached to a side of the work table of a photographic printer. The film end holder has a rectangular main body for receiving an end portion of a developed photographic film and a guide plate projected upward from the main body for guiding the end portion of the developed photographic film being advanced from a film carrier into the main body.

In a preferred embodiment of the present invention, a mounting plate is formed integrally with, and perpendicular to, the main body. The mounting plate is attached on the work table and its end portion is covered by a mat.

In a photographic printer of the present invention, first and second film end holders are attached to both sides of the work table. Prior to printing, a trailing end portion of a developed photographic film is inserted in the first film end holder while a leading end thereof is threaded in a film carrier. The developed photographic film hangs down from the work table into a loop form and will not be brought into contact with the floor. When the leading end is advanced through the film carrier to reach the second film end holder during the printing, it is guided by the guide plate to enter into a main body of the second film end holder. After the leading end runs against the bottom of the main body, the portion of the developed photographic film having been subjected to printing is looped.

According to the present invention, it is not necessary to modify the work table since the film end holder can be easily attached. Also, the leading end portion is guided by the guide plate into the film end holder, which saves the trouble of manually inserting it into the film end holder. Further, the main body of the film end holder has holes formed in a bottom portion thereof to prevent dust from settling thereon. Accordingly, the end portion of the developed photographic film is not likely to be scratched. Because the film end holder has a simple structure, it can be easily manufactured at a low cost.

BRIEF DESCRIPTION OF THE DRAWING

The above and other objects and advantages of this invention will become apparent to one skilled in the art from the following detailed description of a preferred embodiment of the invention when read in connection with the accompanying drawings, in which.

DETAILED DESCRIPTION OF THE PREFERRED EMBODIMENTS

Figure 1:
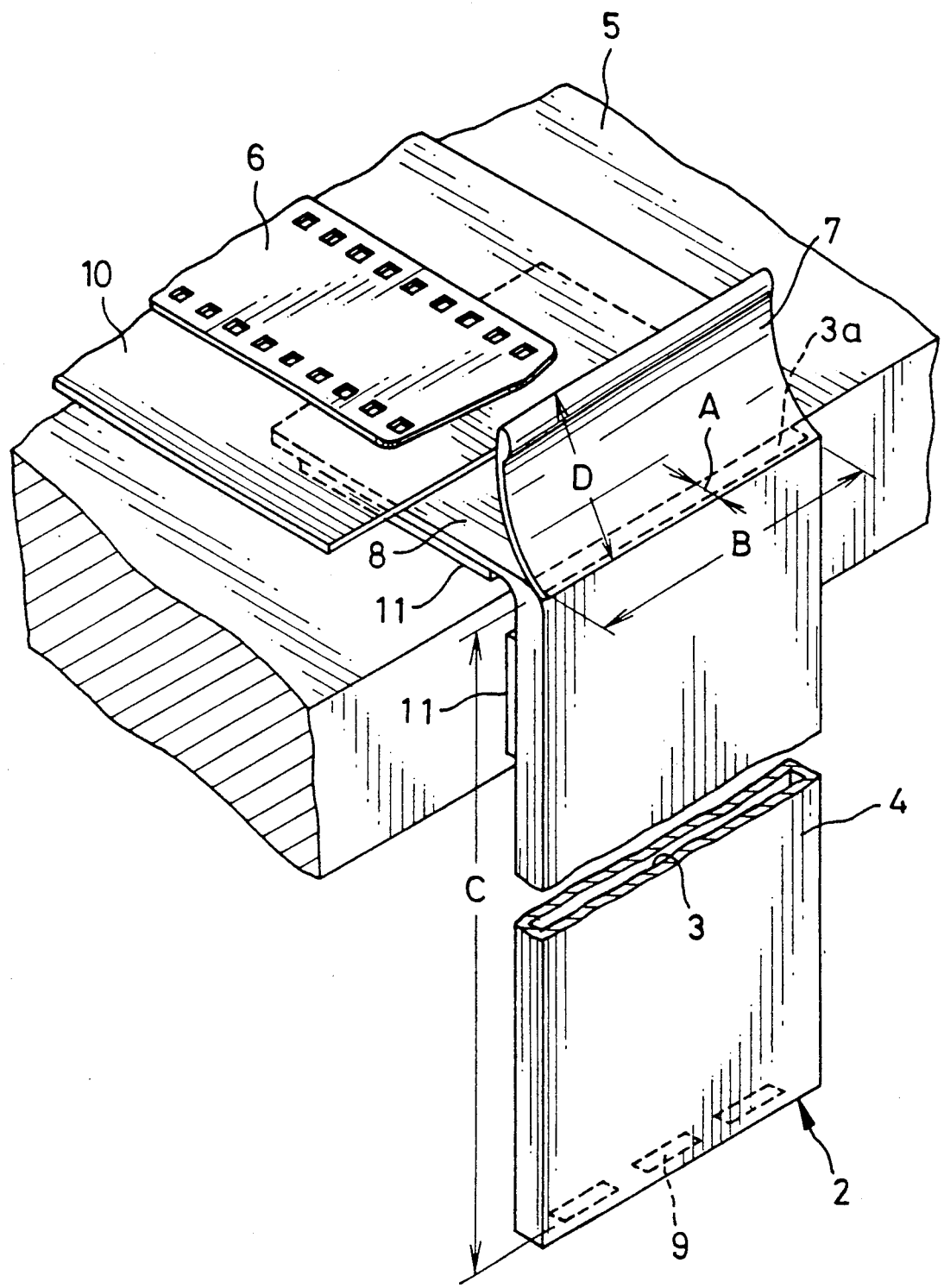
FIG. 1 is a perspective view of a film end holder of a first preferred embodiment attached to a work table.

Referring to FIG. 1, a film end holder 2 of the first preferred embodiment has a thin main body 4 with a cavity 3 formed therein, a guide plate 7 and a mounting plate 8 which is attached to a work table 5 with double-sided adhesive tape 11. The guide plate 7 leads the leading end portion of a developed photographic film 6, being advanced over the work table 5, into the main body 4 through an inlet 3a of the cavity 3. When attaching the mounting plate 8 to the work table 5, the inlet 3a is positioned to be approximately in the same plane as the work table 5. Holes 9 are formed in the bottom of the main body 4 so as to prevent dust from accumulating therein.

The main body 4, the guide plate 7 and the mounting plate 8 are formed integrally of smooth plastic or the like, so as to protect the developed photographic film 6 from scratches. The joint of the main body 4 and the mounting plate 8, and an end of the guide plate 7 are chamfered. When the mounting plate 8 is attached to the work table 5, a stepped portion is created on the upper surface of the work table 5, which tends to catch the leading end of the developed photographic film 6. Therefore, a mat 10 is placed on the work table 5 between the film carrier 18 (see FIG. 2) and the main body 4 so as to overlap with the mounting plate 8.

It is preferable to design the length of a short side A of the cavity 3 to be in a range of 8 mm to 15 mm in order to facilitate insertion and withdrawal of the end portion of the developed photographic film 6. It is also preferable to design the length of a long side B of the cavity 3 to be 80 mm or more in order to allow insertion and withdrawal of wider films. Also, the height C of the main body 4 should be designed to be in a range of 100 mm to 200 mm so as to prevent the end portion of the developed photographic film 6 from slipping out of the main body 4. Further, the length D of the guide plate 7 should be designed to be in a range of 20 mm to 30 mm in order to prevent the developed photographic film 6 from climbing over the guide plate 7.

Figure 2:
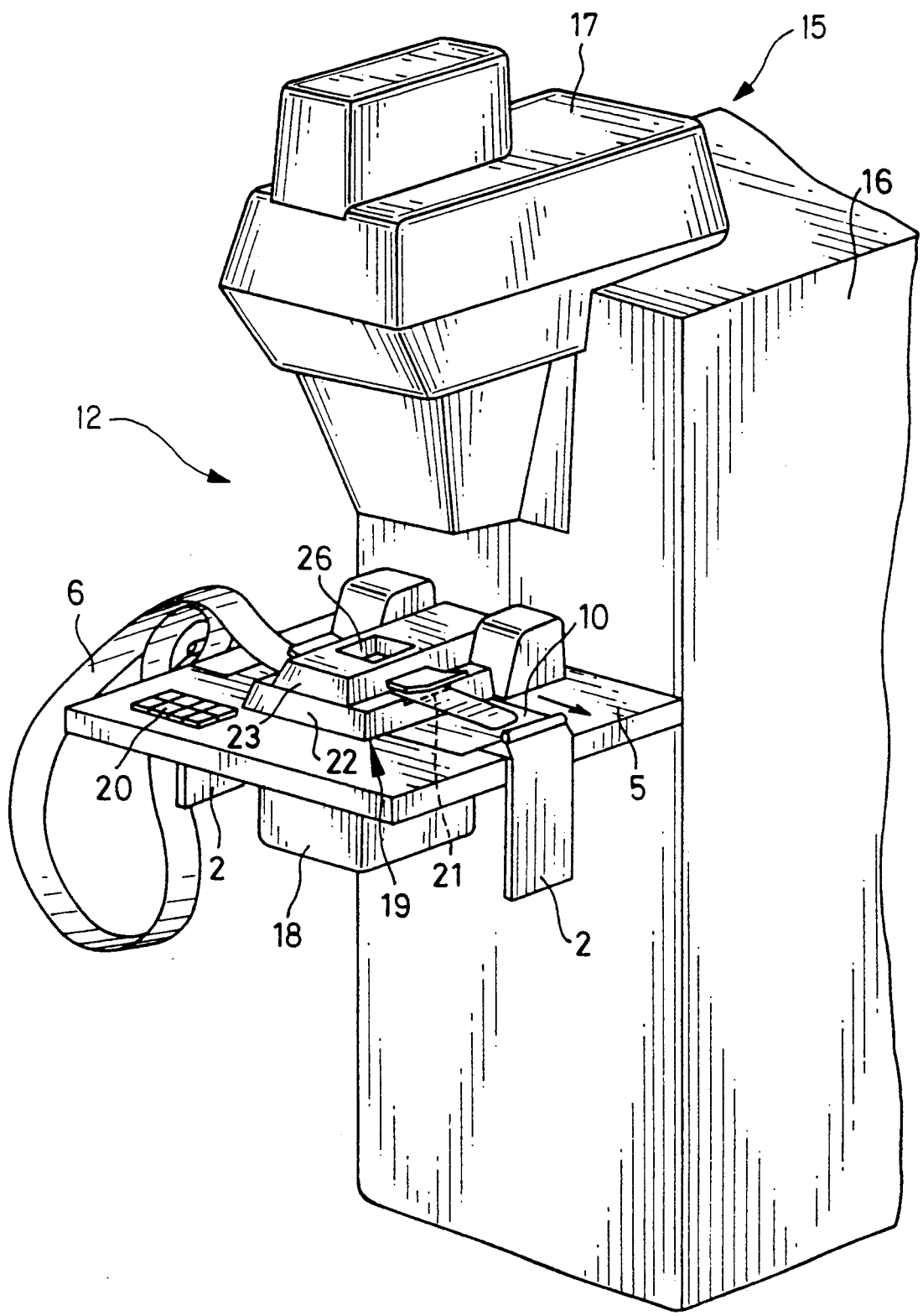
FIG. 2 is a perspective view of a photographic printer in which the film end holders are attached to both lateral sides of the work table.

FIG. 2 illustrates a photographic printer 12 to be used in a minilab with a pair of film end holders 2 attached thereto. The printer processor 12 has a main body 15 and the work table 5 attached to the front of the main body 15. The main body 15 consists of a developing section 16 and an exposure section 17. A light source section 18 is provided under the work table 5. The developing section 16 has a developing tank, a fixing tank, a rinsing tank, a dryer unit, etc. (not shown) therein. The exposure section 18 has a printing lens, a shutter and a magazine containing a roll of color paper, etc. (not shown). The light source section 18 has a lamp, color correction filters and a mixing box (not shown). A pair of film end holders 2 are attached to the lateral sides of the work table 5. A film carrier 19 is disposed on the work table 5. A reference numeral 20 is a keyboard.

Figure 3:
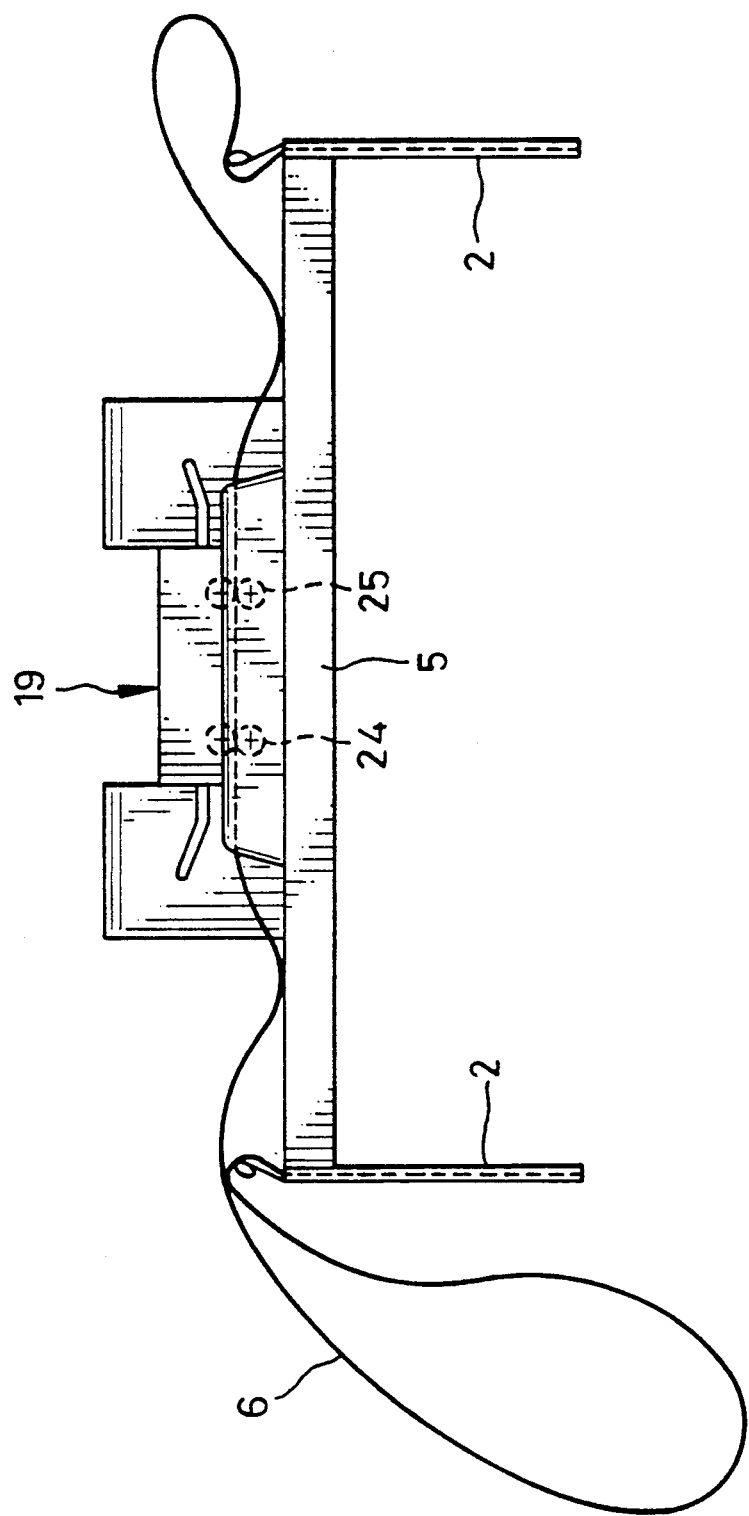
FIG. 3 is an explanatory diagram illustrating an exposed photographic film in the middle of the printing process.

The film carrier 19 is constructed of a base plate 22 with a passage 21 formed therein for allowing the developed photographic film 6 to pass therethrough and a pressure section 23 operably mounted on the base plate 22. The base plate 22 contains a film feeding mechanism consisting of feed rollers 24, 25 (see FIG. 3) and a motor. The film feeding mechanism is driven in response to commands entered with the keyboard 20 to feed the developed photographic film 6 through the passage 21 into the direction indicated by an arrow. An exposure opening 26 is formed in the pressure section 23.

The operation of the first preferred embodiment will be described below. In printing the developed photographic film 6, the trailing end portion of the developed photographic film 6 is inserted in the left film end holder 2. Then, the leading end of the developed photographic film 6 is inserted in the film carrier 19. It is to be noted that the leading end portion of the developed photographic film 6 can also be inserted in the passage 21 of the film carrier 19 before the trailing end portion of the developed photographic film 6 is inserted in the left film end holder 2. In this condition, the developed photographic film 6 forms a loop between the left film end holder 2 and the film carrier 19 so that the length of the developed photographic film 6 hanging down from the work table 5 is less than half the entire length of the developed photographic film 6. Therefore, the trailing end of the developed photographic film 6 will not be brought into contact with the floor.

Upon entering a command through the keyboard 20, the feed rollers 24, 25 are rotated by the motor to feed the developed photographic film 6 to position a first frame thereof at the exposure opening 26. Then, another command is entered through the keyboard 20 to print the image of the first frame on the color paper. Thereafter, the motor is driven to position a second frame to the exposure opening 26 to be ready for next printing. Repetition of the printing causes the leading end of the developed photographic film 6 to be fed out of the film carrier 19 to slide over the mat 10.

When the frames of the developed photographic film 6 have been further printed, the leading end of the developed photographic film 6 is brought into contact with the guide plate 7, which directs the advancing direction of the developed photographic film 6 downward to make the leading end of the developed photographic film 6 enter the cavity 3 of the main body 4 through the inlet 3a. After the leading end of the developed photographic film 6 reaches the bottom of the main body 4, the developed photographic film 6 forms a loop on the right side of the work table 5. Then, as each frame is printed, the right loop becomes larger and the left loop becomes smaller. If the leading end portion of the developed photographic film 6 is extremely curved to head upward, the advancement of the leading end of the developed photographic film 6 may be obstructed by the guide plate 7, necessitating that the leading end of the developed photographic film 6 be manually placed into the main body 4.

Figure 4:
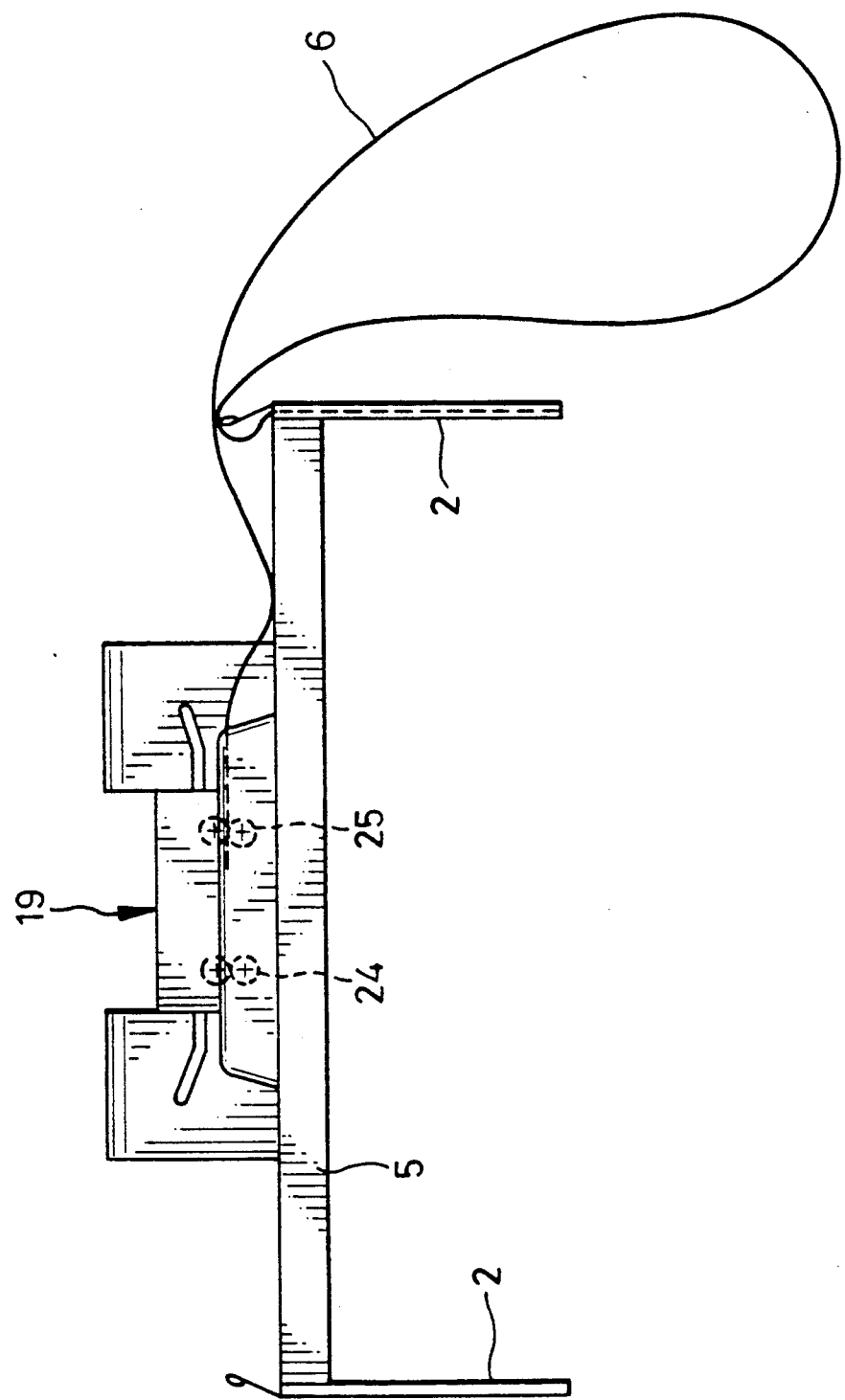
FIG. 4 is an explanatory diagram illustrating the exposed photographic film in the end of the printing process.

When the printing operation is almost completed, the trailing end portion is pulled out of the left film end holder 2 and slid over the work table 5. As soon as the last frame is printed, advancement of the developed photographic film 6 is stopped and the trailing end portion is nipped by the feed rollers 25 as illustrated in FIG. 4. In this condition, the developed photographic film 6 is looped between the film carrier 19 and the right film end holder 2 so that it will not touch the floor. Removal of the developed photographic film 6 from the work table 5 can be easily performed by pulling the leading end portion as well as the trailing end portion of the developed photographic film 6.

Figure 5:
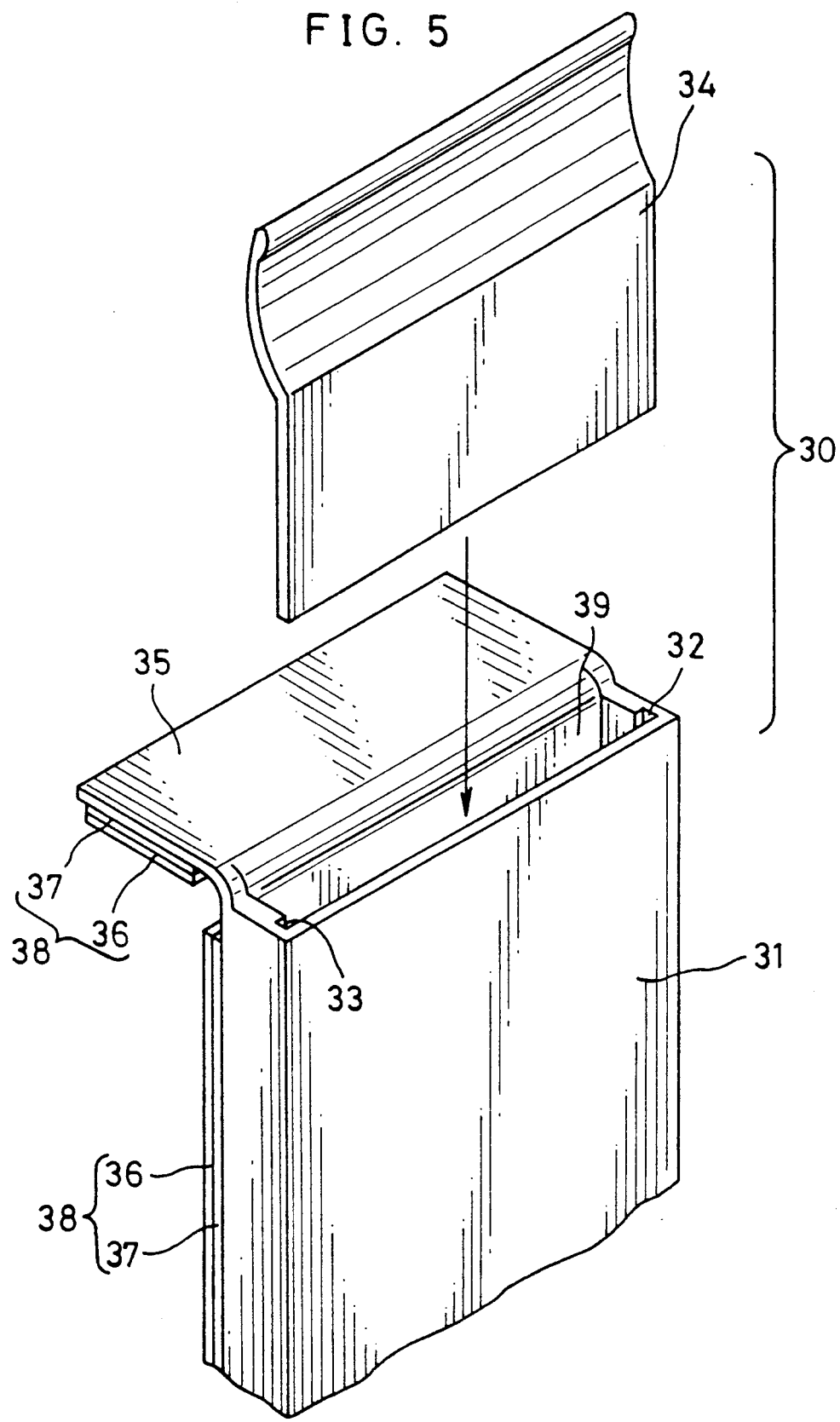
FIG. 5 is a perspective view of a film end holder of a second preferred embodiment.

FIG. 5 illustrates a second preferred embodiment of the present invention, wherein a film end holder 30 consists of a main body 31 and a removable guide plate 34. The main body 31 has an inlet 39 and grooves 32, 33 along which the guide plate 34 is inserted. A mounting plate 35 and main body 31 have double-sided adhesive tapes 38 consisting of peelable papers 36 and adhesives 37 in order to attach the film end holder 30 to the work table 5.

The film end holders of the embodiments are attached to both sides of the work table of the printer but the left film end holder may be omitted. In that case, the developed photographic film is wound and disposed on the work table 5. Further, if the mounting plate 8 can be pressed against the work table 5 firmly by the mat 10, the double-sided adhesive tape is not necessary.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A film end holder to be used in a photographic printer having a work table and a film carrier disposed on said work table, a developed photographic film being threaded through said film carrier for printing, said film end holder comprising;
    a main body having an inlet and a thin cavity formed therein, said thin cavity being connected to said inlet for removably receiving an end portion of said developed photographic film through said inlet, said photographic film being stocked in a loop form between said main body and said film carrier when said end portion of said photographic film is inserted in said cavity;
    mounting means for attaching said main body to a side of said work table such that said inlet corresponds with an upper surface of said work table; and
    a guide plate extending from said main body for guiding said end portion of said photographic film having been advanced from said film carrier over said work table into said inlet.

2. A film end holder as recited in claim 1, wherein said main body is in the shape of a thin rectangular box.

3. A film end holder as recited in claim 2, wherein said guide plate projects from a first long side of said main body proximate said inlet and opposite from said work table, said guide plate being inclined toward said work table.

4. A film end holder as recited in claim 3, wherein said mounting means includes a mounting plate disposed on said upper surface of said work table, said mounting plate extending from a second long side of said main body proximate said inlet approximately perpendicularly to said main body so as to face said guide plate.

5. A film end holder as recited in claim 4, wherein said mounting plate is attached to said upper surface of said work table by a double-sided adhesive tape.

6. A film end holder as recited in claim 4, wherein said mounting plate is integrally formed with said main body.

7. A film end holder as recited in claim 6, wherein said main body has at least one hole formed in a bottom surface thereof to prevent dust from being accumulated on said bottom surface.

8. A film end holder as recited in claim 7, wherein said guide plate, said main body and said mounting plate are integrally formed of plastic.

9. A film end holder as recited in claim 7, wherein said guide plate is removably attached to said main body.

10. A film end holder as recited in claim 9, wherein a portion of said guide plate is inserted along a pair of grooves formed in respective lateral inside surfaces of said main body.

11. A photographic printer for printing a developed photographic film, said printer having a work table and a film carrier disposed on said work table, said photographic film is threaded through said film carrier, said photographic printer comprising:
    a first film end holder disposed on a side of said work table so as to removably receive a trailing end portion of said photographic film to stock said photographic film in a loop form between said first film end holder and said film carrier;
    a second film end holder disposed on the other side of said work table so as to removably receive a leading end of said photographic film to stock said photographic film in a loop form between said film carrier and said second film end holder;
    each of said film end holders including a main body having an inlet and a cavity formed therein, said cavity being connected to said inlet for receiving one of said trailing and leading end portions of said photographic film therein, a guide plate extending from said main body for guiding the end portion of said photographic film into said cavity through said inlet, and a mounting plate disposed on said work table;
    each of said guide plates being projected from a first long side of said main body proximate said inlet and away from said work table, said guide plates being inclined toward said work table; and
    each of said mounting plates extending from a second long side of said inlet approximately perpendicularly to said main body.

12. A photographic printer as recited in claim 11, wherein said main body is in the shape of a thin rectangular box.

13. A photographic printer as recited in claim 12, further comprising a mat disposed on an upper surface of said work table between said film carrier and said mounting plate of said second film end holder, said mat overlapping said mounting plate.

14. A photographic printer as recited in claim 13, wherein said film carrier has a pair of feed rollers mounted therein, a portion of said photographic film being nipped between said rollers.

15. A photographic printer as recited in claim 14, wherein each of said mounting plates is attached to the upper surface of said work table by a double-sided adhesive tape.

16. A photographic printer as recited in claim 15, wherein each of said mounting plates is formed integrally with said main body.

17. A photographic printer as recited in claim 16, wherein said main body has at least one hole formed in a bottom surface thereof to prevent dust from being accumulated on said bottom surface.

18. A photographic printer as recited in claim 17, wherein respective ones of said guide plates, said main bodies and said mounting plates are integrally formed of plastic.

19. A photographic printer as recited in claim 17, wherein each of said guide plates is removably attached to a respective one of said main bodies.

20. A photographic printer as recited in claim 19, wherein a portion of each of said guide plates is inserted along a pair of grooves formed in respective lateral inside surfaces of a respective one of said main bodies.

* * * * *